(12) United States Patent
Yamamoto

(10) Patent No.: US 6,507,815 B1
(45) Date of Patent: Jan. 14, 2003

(54) SPEECH RECOGNITION APPARATUS AND METHOD

(75) Inventor: Hiroki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/538,388

(22) Filed: Mar. 29, 2000

(30) Foreign Application Priority Data

Apr. 2, 1999 (JP) ............................................. 11-097041

(51) Int. Cl.⁷ ............................................... G10L 15/06
(52) U.S. Cl. ..................... 704/231; 704/236; 704/239; 704/243
(58) Field of Search .................................. 704/231, 270, 704/275, 236, 239, 240, 243; 382/215

(56) References Cited

U.S. PATENT DOCUMENTS

| | | | | |
|---|---|---|---|---|
| 5,067,166 A | * | 11/1991 | Ito | 382/215 |
| 6,067,520 A | * | 5/2000 | Lee | 704/270 |
| 6,243,669 B1 | * | 6/2001 | Horiguchi et al. | 704/9 |
| 6,278,968 B1 | * | 8/2001 | Franz | 704/3 |

OTHER PUBLICATIONS

V. Steinbiss, B.—H. Tran, H. Ney; "Improvement in Beam Search", Proc. ICSLP, Yokohama, pp. 2143–2146, Sep. 1994.

S. Ortmanns, H. Ney, A. Eiden; "Language–Model Look–Ahead for Large Vocabulary Speech Recognition", Proc. ICSLP, Philadelphia, pp. 2095–2098, Oct. 1996.

* cited by examiner

*Primary Examiner*—Susan McFadden
(74) *Attorney, Agent, or Firm*—Morgan & Finnegan, L.L.P.

(57) ABSTRACT

A group of words to be registered in a word dictionary are sorted in order of sound models to produce a word list. A tree-structure word dictionary in which sound models at head part of the words are shared among the words, is prepared using this word list. Each node having a different set of reachable words from a parent node holds word information including a minimum out of word IDs of words reachable from that node, and the number of words reachable from that node. For searching for a word matching with speech input, language likelihoods are looked ahead using this word information. The word matching with the speech input can be recognized efficiently, using such a tree-structure word dictionary and a look-ahead method of language likelihood.

21 Claims, 11 Drawing Sheets

赤城 (akagi)
悪意 (akui)
子供 (kodomo)
赤い (akai)
空き箱 (akibako)
米 (kome)
雨 (ame)
赤坂 (akasaka)
悪党 (akutoo)
赤 (aka)
雲 (kumo)
空き巣 (akisu)

FIG. 12

| WORD ID. | WORD (PHONEME) |
|---|---|
| 1. | 赤 (aka) |
| 2. | 赤城 (akagi) |
| 3. | 赤い (akai) |
| 4. | 赤坂 (akasaka) |
| 5. | 空き箱 (akibako) |
| 6. | 空き巣 (akisu) |
| 7. | 悪意 (akui) |
| 8. | 悪党 (akutoo) |
| 9. | 雨 (ame) |
| 10. | 子供 (kodomo) |
| 11. | 米 (kome) |
| 12. | 雲 (kumo) |

SPEECH RECOGNITION APPARATUS AND METHOD

BACKGROUND OF THE INVENTION

1. Field of the Invention

The present invention relates to a speech recognition apparatus and method using a tree-structure word dictionary.

2. Related Background Art

Processing is carried out according to the following procedures in speech recognition using sound models in the Hidden Markov Model (HMM) or the like. First, features of speech input are extracted. Then output probabilities of sound models constituting each word are acquired according to the relationship between words and sound models described in the word dictionary. Then likelihoods of respective states of each word or each sound model (for example, phoneme) forming the word are retrieved using a search technique such as the Viterbi search or the like, and the speech recognition is carried out based thereon.

FIG. 1 is an explanatory diagram to show an example of the word dictionary. FIG. 1 shows <TOKYO>, <TOKAI>, and <TOHOKU> as an example of words (also called recognition object words) described in the word dictionary. In this example, phonemic models are used as sound models. Each word is expressed by connection of phonemic models. For example, <TOKYO> is constructed of phonemic models (Japanese language phonemic models) of "t," "o,", "o," "k," "y," "o," and "o."

In the speech recognition with reference to large vocabulary, there appear a lot of words having the same phonemic models as the head part of a certain word, as in the case of the example illustrated in FIG. 1. The word dictionary in which head portions of some words are not shared, as in FIG. 1, is called a linear lexicon. In contrast with it, a word dictionary in which head portions of some words are shared is called a tree-structure word dictionary (also called a tree lexicon). Since sound likelihoods of the shared portions are equal, the tree lexicon permits computation of sound likelihood to be omitted at the shared portions.

FIG. 2 is a diagram to explain the tree lexicon using the words listed in FIG. 1. As illustrated in FIG. 2, the tree lexicon is comprised of nodes representing the phonemic models, and arcs connecting the nodes to each other.

Suggested as a technique for searching such a tree-structure word dictionary for a word matching best with speech input is a technique using both language likelihoods acquired from language models represented by word chain probabilities (N-gram) or the like and sound likelihoods computed from sound models. This technique is known as one achieving the effects including improvement in recognition performance, reduction of search space, and so on.

Use of the tree-structure word dictionary, however, poses the following problem.

In the case of the linear lexicon being used as a word dictionary, because a word can be specified at the head part of the word, reference can be made to a language likelihood of that word in computing a likelihood of the first state owned by a sound model (i.e., a phoneme) at the head of that word.

In the case of the tree lexicon being used as a word dictionary, however, a word can be specified first upon arrival at a node immediately after a last-branched node. In the example of FIG. 2, the words can be specified first upon arrival at nodes 201 to 203 indicated by bold circles. Therefore, times of use of language likelihoods are late, thus posing the problem that the reduction is not enough in the search space.

SUMMARY OF THE INVENTION

An object of the present invention is to solve the above-described problem.

Another object of the invention is to provide a speech recognition apparatus and method for efficient recognition of words matching with speech input by use of the tree-structure word dictionary.

As a preferred embodiment for such objects, the present invention discloses a speech recognition apparatus comprising:

(a) holding means for holding a tree-structure word dictionary in which sound models at head part of words are shared among the words, wherein said tree-structure word dictionary is comprised of nodes representing said sound models; and (b) searching means for searching for a word corresponding to speech input, using word information given to predetermined nodes forming said tree-structure word dictionary, wherein said word information is information to specify a word group reachable from each of said predetermined nodes.

As another embodiment, the present invention discloses a speech recognition method comprising the steps of:

(a) holding a tree-structure word dictionary in which sound models at head part of words are shared among the words, wherein said tree-structure word dictionary is comprised of nodes representing said sound models; and (b) searching for a word corresponding to speech input, using word information given to predetermined nodes forming said tree-structure word dictionary, wherein said word information is information to specify a word group reachable from each of said predetermined nodes.

As another embodiment, the present invention discloses a computer-readable medium storing a program, said program comprising the steps of:

(a) holding a tree-structure word dictionary in which sound models at head part of words are shared among the words, wherein said tree-structure word dictionary is comprised of nodes representing the sound models; and (b) searching for a word corresponding to speech input, using word information given to predetermined nodes forming said tree-structure word dictionary, wherein said word information is information to specify a word group reachable from each of said predetermined nodes.

As another embodiment, the present invention discloses an apparatus for producing a word dictionary used in speech recognition, said apparatus comprising:

(a) sorting means for sorting a plurality of words, based on sound models representing the words;

(b) generating means for generating a tree-structure word dictionary in which sound models at head part of the words are shared among the words, wherein said tree-structure word dictionary is comprised of nodes representing said sound models; and (c) providing means for providing predetermined nodes forming said tree-structure word dictionary with word information to specify a word group reachable from each of said predetermined nodes.

As another embodiment, the present invention discloses a method for producing a word dictionary used in speech recognition, comprising the steps of:

(a) sorting a plurality of words, based on sound models representing the words;

(b) generating a tree-structure word dictionary in which sound models at head part of the words are shared among the words, wherein said tree-structure word dictionary is comprised of nodes representing said sound models; and (c) providing predetermined nodes forming said tree-structure word dictionary with word information to specify a word group reachable from each of said predetermined nodes.

As still another embodiment, the present invention discloses a computer-readable medium, said medium storing a program for producing a word dictionary used in speech recognition, said program comprising the steps of:

(a) sorting a plurality of words, based on sound models representing the words;

(b) generating a tree-structure word dictionary in which sound models at head part of the words shared among the words, wherein said tree-structure word dictionary is comprised of nodes representing said sound models; and (c) providing predetermined nodes forming said tree-structure word dictionary with word information to specify a word group reachable from each of said predetermined nodes.

Still other objects of the present invention, and the advantages thereof, will become fully apparent from the following detailed description of the embodiments.

BRIEF DESCRIPTION OF THE DRAWINGS

FIG. 12 is a diagram to show an example of a word list provided with word IDs;

DESCRIPTION OF THE PREFERRED EMBODIMENTS

The preferred embodiments of the present invention will now be described in detail hereinafter with reference to the accompanying drawings.

The preferred embodiments of the present invention will be described illustratively in detail with reference to the drawings. It is, however, noted that the scope of the invention is by no means intended to be limited to the relative layout of constituent elements, equations, numerals, etc. described in the embodiments, unless otherwise specified.

Proposed in the present embodiment is a method for permitting both the sound and language likelihoods at common part to be used even in a stage where a word is not determined uniquely, in the case of use of the tree-structure word dictionary (tree lexicon). This method is implemented by looking the language likelihood ahead. The look-ahead of language likelihood generally means that a maximum (which will be called a "look-ahead value") out of the language likelihoods of all words reachable from the common part is used as a language likelihood.

Specifically, the following word dictionaries (1) to (4) can be considered as tree-structure word dictionaries for implementing the look-ahead of language likelihood.

(1) Word IDs (word numbers or the like) for specifying respective words are held at the end of the tree-structure word dictionary. The method for the look-ahead of language likelihood is to find language likelihoods of all reachable words by a search of the tree toward its leaves and define a maximum out of the language likelihoods obtained as a result, as a language likelihood.

This method, however, does not allow sufficient reduction of the search space. Therefore, there arises the problem that more time becomes necessary for the search for reachable words and the look-ahead of language likelihood as the number of recognition object words (i.e., words registered in the word dictionary) increases to enlarge the tree lexicon.

Figure 1:
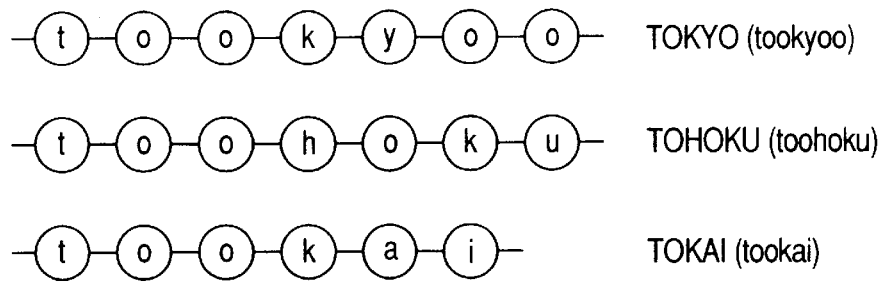
FIG. 1 is a diagram to explain the linear lexicon as an example of the word dictionary.
Figure 2:
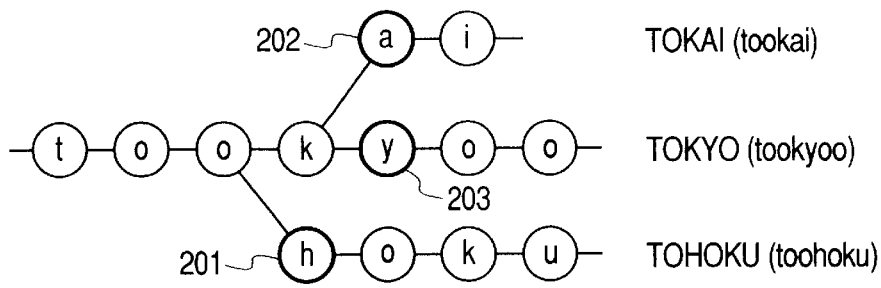
FIG. 2 is a diagram to explain the tree lexicon as an example of the word dictionary.
Figure 3:
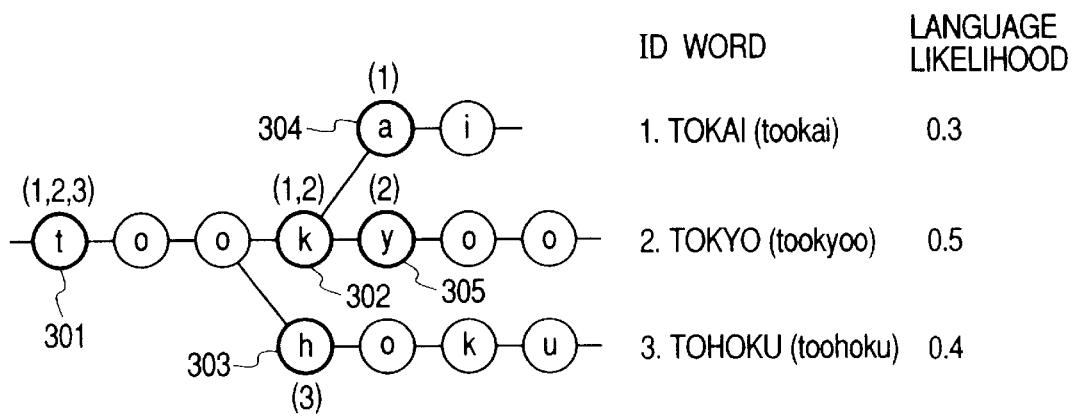
FIG. 3 is a diagram to show an example of the tree-structure word dictionary.

(2) Each of predetermined nodes in the tree-structure word dictionary holds all word IDs that specify words reachable from that node. An example of this word dictionary is presented in FIG. 3. In this example, each of nodes 301 to 305 (indicated by bold circles) whose reachable words are different from those of a node immediately before it, holds word IDs of the words reachable from the node.

This method, however, has the problem that with increase in the number of recognition object words the number of word IDs held by one node increases, so as to increase a storage area necessary for the word dictionary.

Figure 4:
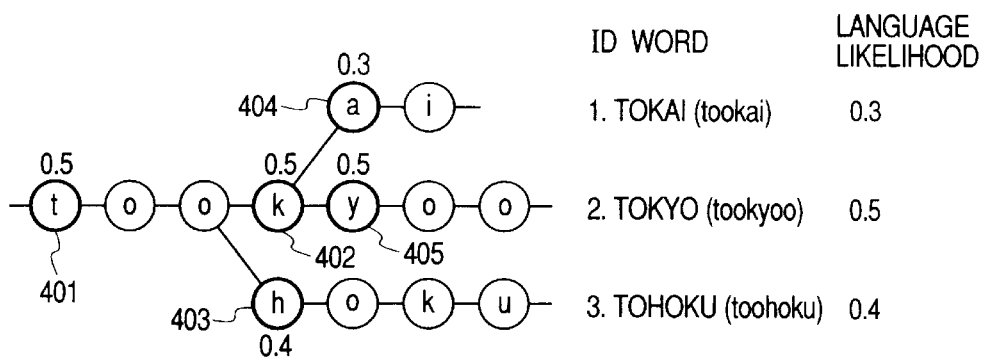
FIG. 4 is a diagram to show another example of the tree-structure word dictionary.

(3) Each of predetermined nodes in the tree-structure word dictionary holds a maximum (i.e., a look-ahead value) out of language likelihoods of words reachable from the node. An example of this word dictionary is presented in FIG. 4. In this example, each of nodes 401 to 405 (indicated by bold circles) whose reachable words are different from those of a node immediately before it, holds a look-ahead value.

In this method, however, the dictionary needs to hold language likelihoods per preceding word when the bigram or the trigram is employed for the language likelihoods. This thus poses the problem that the storage area necessary for the word dictionary becomes larger with increase in the number of preceding words.

Figure 5:
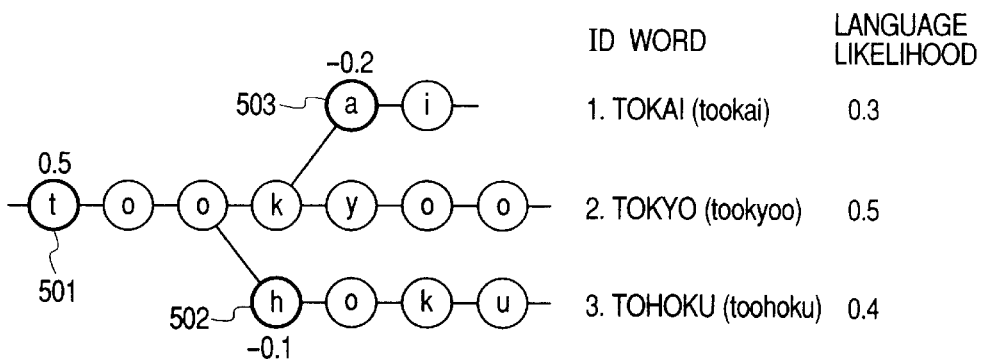
FIG. 5 is a diagram to show another example of the tree-structure word dictionary.

(4) Each of predetermined nodes in the tree-structure word dictionary holds a difference between a language likelihood (i.e., a look-ahead value) of its own and a language likelihood (i.e., a look-ahead value) of a node immediately before it (i.e., a node adjacent in the direction toward the root). An example of this word dictionary is presented in FIG. 5. In this example, each of root node 501 of the tree, and nodes 502, 503 (indicated by bold circles) whose reachable words are different from those of a node immediately before it, holds a difference between language likelihoods.

In this method, however, the dictionary needs to hold language likelihoods per preceding word when the bigram or the trigram is employed for the language likelihoods, as in the case of above (3). It thus raises the problem that the storage area necessary for the word dictionary becomes larger with increase in the number of preceding words.

The present embodiment provides the tree-structure word dictionary and the look-ahead method of language likelihood capable of solving the problems in the above methods (1) to (4). An example of the present embodiment will be explained below referring to FIG. 6 to FIG. 15.

Figure 6:
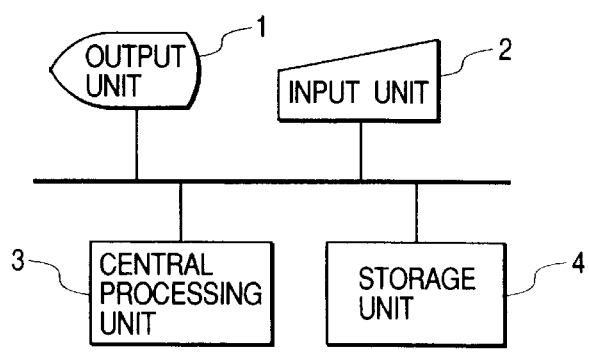
FIG. 6 is a block diagram to show an example of the hardware structure of a speech recognition system in the present embodiment.

FIG. 6 is an example of the hardware structure of a speech recognition system in the present embodiment.

In FIG. 6, numeral 1 designates an output unit for visually outputting through a display or for auditorily outputting through a loudspeaker, the result of speech recognition, or a response obtained as a result of speech recognition.

Numeral 2 designates an input unit for input of speech.

Numeral 3 denotes a central processing unit for carrying out processing of numerical computation-control etc., which governs computation and data processing according to the processing procedures described hereinafter. Numeral 4 represents a storage unit consisting of an external memory unit such as a disk unit or the like, and internal memories such as RAM, ROM, or the like, which stores programs written to include the processing procedures described hereinafter, which temporarily saves data necessary for the data processing described hereinafter, and which stores the tree-structure word dictionary described hereinafter, sound models, and language models.

A speech recognition method described below can be implemented by the above hardware structure.

Figure 7:
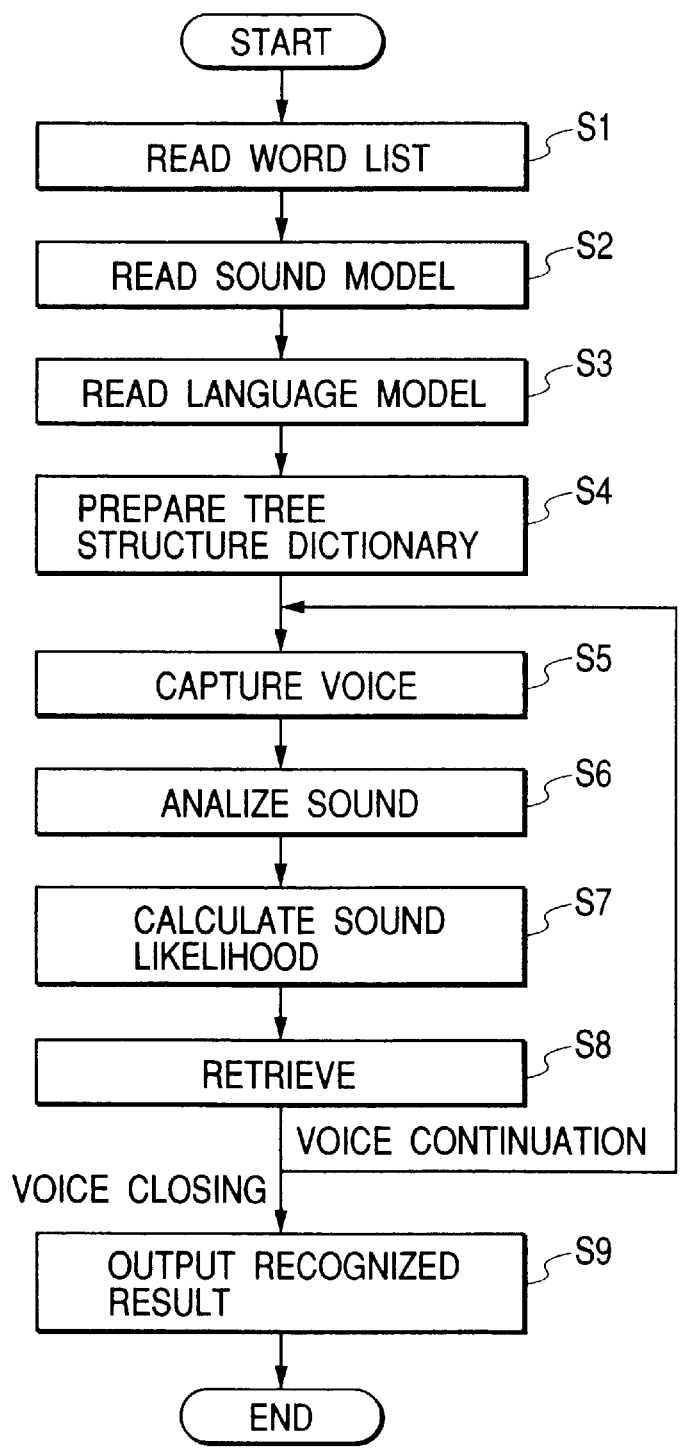
FIG. 7 is a flowchart to explain speech recognition processing in the present embodiment.

FIG. 7 is a an example of the speech recognition processing according to the present embodiment.

First, step S1 is to read a list of words that can be recognition objects. An example of the word list is presented in FIG. 8. Described in the word list are words and sound models constituting the words.

Next, step S2 is to read the sound models constituting the words. The HMM (Hidden Markov Model) or the like is used for the sound models. Next, step S3 is to read language models used in computation of language likelihood. The N-gram or the like is used for the language models.

Then step S4 is to prepare the tree-structure word dictionary associated with the present embodiment, based on the above-stated word list.

Next, step S5 is to capture voice entered into the input unit 2 by use of a microphone or the like, at intervals of a given time.

Step S6 is to carry out a sound analysis for the captured voice to obtain feature parameters such as cepstrum or the like.

Next, step S7 is to compute sound likelihoods of respective sound models corresponding to the feature parameters.

Figure 9:
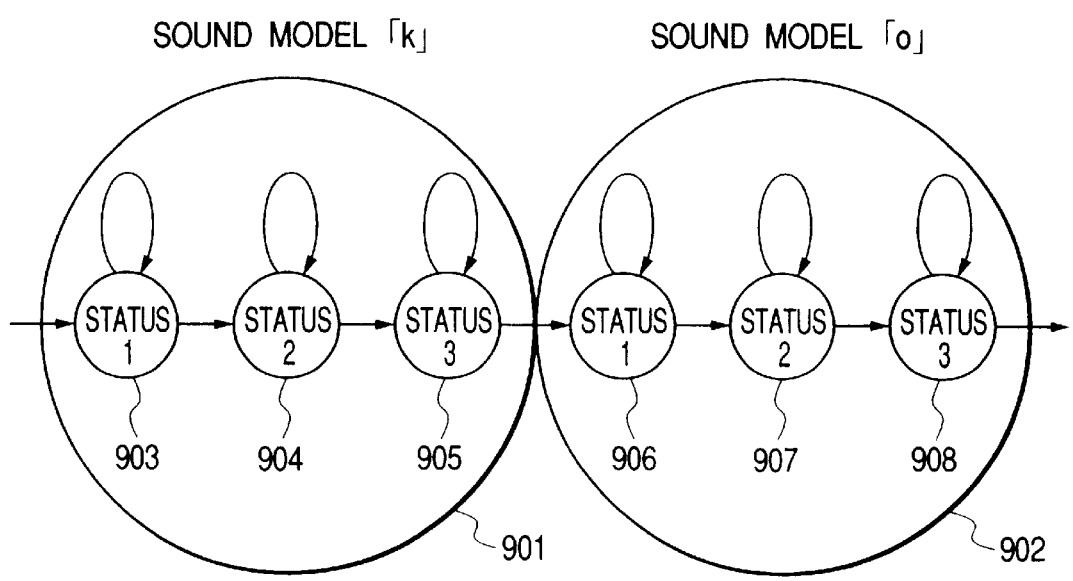
FIG. 9 is a diagram to show statuses constituting sound models and transition thereof in the present embodiment.

Next, step S8 is to retrieve a word matching best with the input voice. In step S8, a cumulative likelihood of each node is updated in the descending order from the head node according to the sound models (each sound model will be expressed as a node in the following description) constituting the tree-structure dictionary by use of a search technique such as the Viterbi search or the like. A sound model is generally composed of a plurality of statuses as illustrated in FIG. 9. Therefore, the cumulative likelihood is held for each of statuses 903 to 905, 906 to 908 of the sound models corresponding to the respective nodes 901, 902. The updating of cumulative likelihood is also carried out for each of the statuses 903 to 905, 906 to 908. Here each node holds node information including the following information, in addition to the cumulative likelihoods. Namely, it is information concerning histories before arrival at the respective statuses, language likelihoods of the respective statuses, and so on.

In step S8, the look-ahead of language likelihood is further carried out if necessary upon updating of cumulative likelihood, and the language likelihood is updated.

In general, the cumulative likelihood is calculated according to the following equation, using a cumulative value of logarithmic sound likelihood and a cumulative value of logarithmic language likelihood. In the equation, w represents a weight.

<cumulative likelihood>=<cumulative value of logarithmic sound likelihood>+w×<cumulative value of logarithmic language likelihood>

The above processing from step S5 to step S8 is carried out repeatedly before input of voice is ceased. After the end of input of voice, step S9 is to obtain a series with the highest likelihood and output it as a recognition result.

Next described in detail are the method for producing the tree-structure dictionary in step S4 and the look-ahead method of language likelihood in step S8.

<Process for producing tree-structure dictionary>

Figures 10, 11:
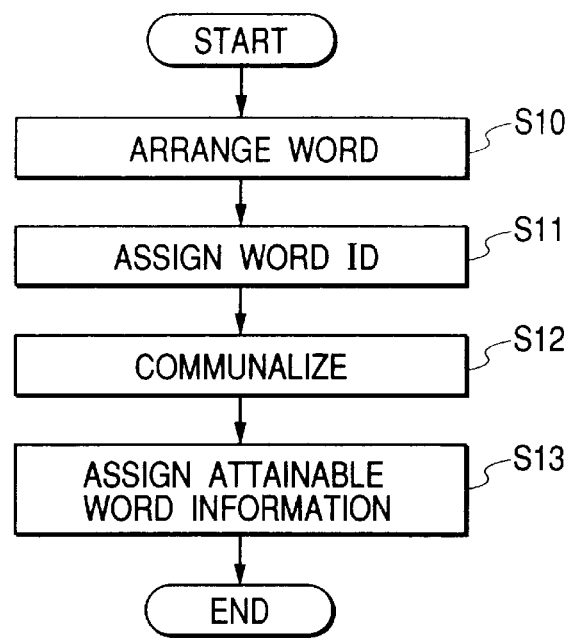
FIG. 10 is a flowchart to explain procedures for producing the tree-structure word dictionary in the present embodiment.
FIG. 11 is a diagram to show an example of an order of phonemes.

FIG. 10 is a flowchart to detail the procedures for producing the tree-structure word dictionary (tree lexicon) in the present embodiment.

First, step S10 is to sort the recognition object words (i.e., a plurality of words to be registered in the word dictionary) in the order of phonemes (i.e., sound models).

An example of the method for sorting the words will be described below. In this example, the order is determined as follows for a word A=a1, a2, . . . , an composed of n phonemes and a word B=b1, b2, . . . , bm composed of m phonemes.

(i) i=0.

(ii) An increment of 1 is given to i (i=i+1).

(iii) When i>n or i>m, the order is determined as follows and the process is terminated.
If n=m then A=B; if n>m then A>B; if n<m then A<B.

(iv) When ai=bi, the process returns to (ii).

(v) It is determined that A>B if ai>bi or that A<B if ai<bi, and then the process is terminated.

In this process the order between phonemes ai, bi is determined according to the alphabetical order, where a name of each phoneme (phonemic name) can be expressed as an alphabetical character. When phonemic names are expressed using a plurality of alphabetical letters or symbols as illustrated in FIG. 11, a phonemic number is preliminarily assigned to each phoneme and the order is determined using such phonemic numbers.

Figure 8:
FIG. 8 is a diagram to show an example of a word list in the present embodiment.

Next, step S11 is to assign word IDs to the sorted words in order. The word IDs used herein are those allowing determination of the order (also referred to as magnitude) between words, such as numbers, alphabet letters, or the like. FIG. 12 shows an example in which the words in the word list of FIG. 8 are sorted and in which a number as a word ID is assigned to each word.

Figure 13:
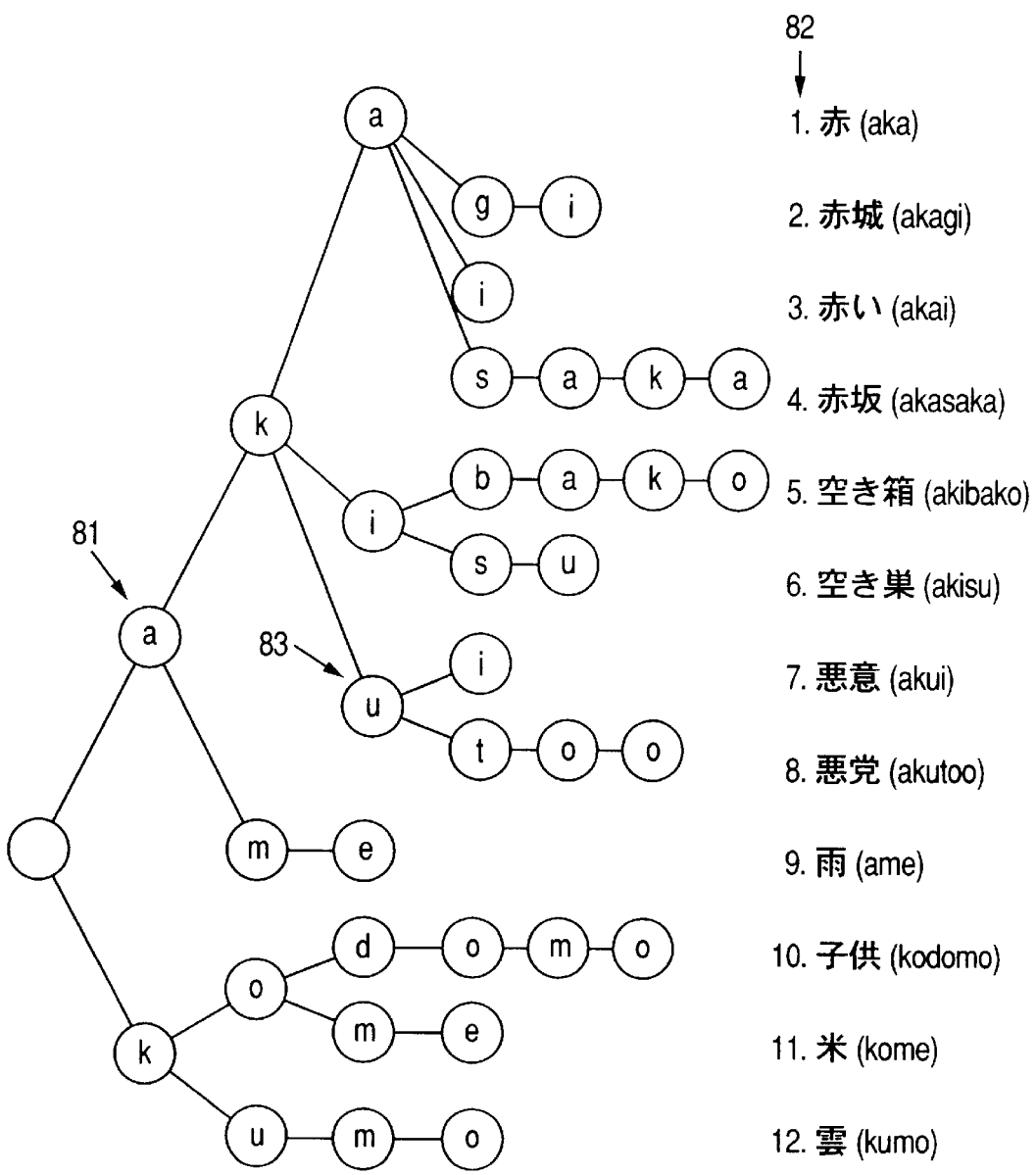
FIG. 13 is a diagram to show an example of the tree-structure word dictionary in the present embodiment.

Next, step S12 is to compare the words in order and perform sharing of head portions of the respective words, thereby producing the tree-structure word dictionary. FIG. 13 shows the tree-structure word dictionary produced based on the sharing of the head portions of the respective words presented in FIG. 12.

Next, step S13 is to give each of predetermined nodes constituting the tree-structure word dictionary, information to designate a set of words reachable from the node (the information will be referred to hereinafter as word information).

As illustrated in FIG. 13, when the tree-structure word dictionary is produced by sorting the words and assigning the word IDs to the words in the sorted order, a set of reachable words from each node (also referred to as a word group) has continuous word IDs. For example, in FIG. 13, a word group reachable from a node 81 (representing "a") indicated by an arrow has nine words, and their word IDs 82 are 1 to 9. Another word group reachable from a node 83 (representing "u") indicated by an arrow has two words, and their word IDs 82 are 7 and 8. In all the cases, word IDs of words are continuous numbers as described above. Making use of this property, the present embodiment is arranged to assign the following values to each of the predetermined nodes:

(1) A minimum out of word IDs in the word group reachable from the node;

(2) The number of words in the word group reachable from the node. These information is the word information and this word information is part of the node information given to each node.

It is noted here that this word information is not given to all the nodes, but is given only to the root node and nodes each having a different set of reachable words from a parent node. A set of reachable words varies depending upon branching of the tree. The above-stated word information is thus given to the nodes immediately after branching.

Figure 14:
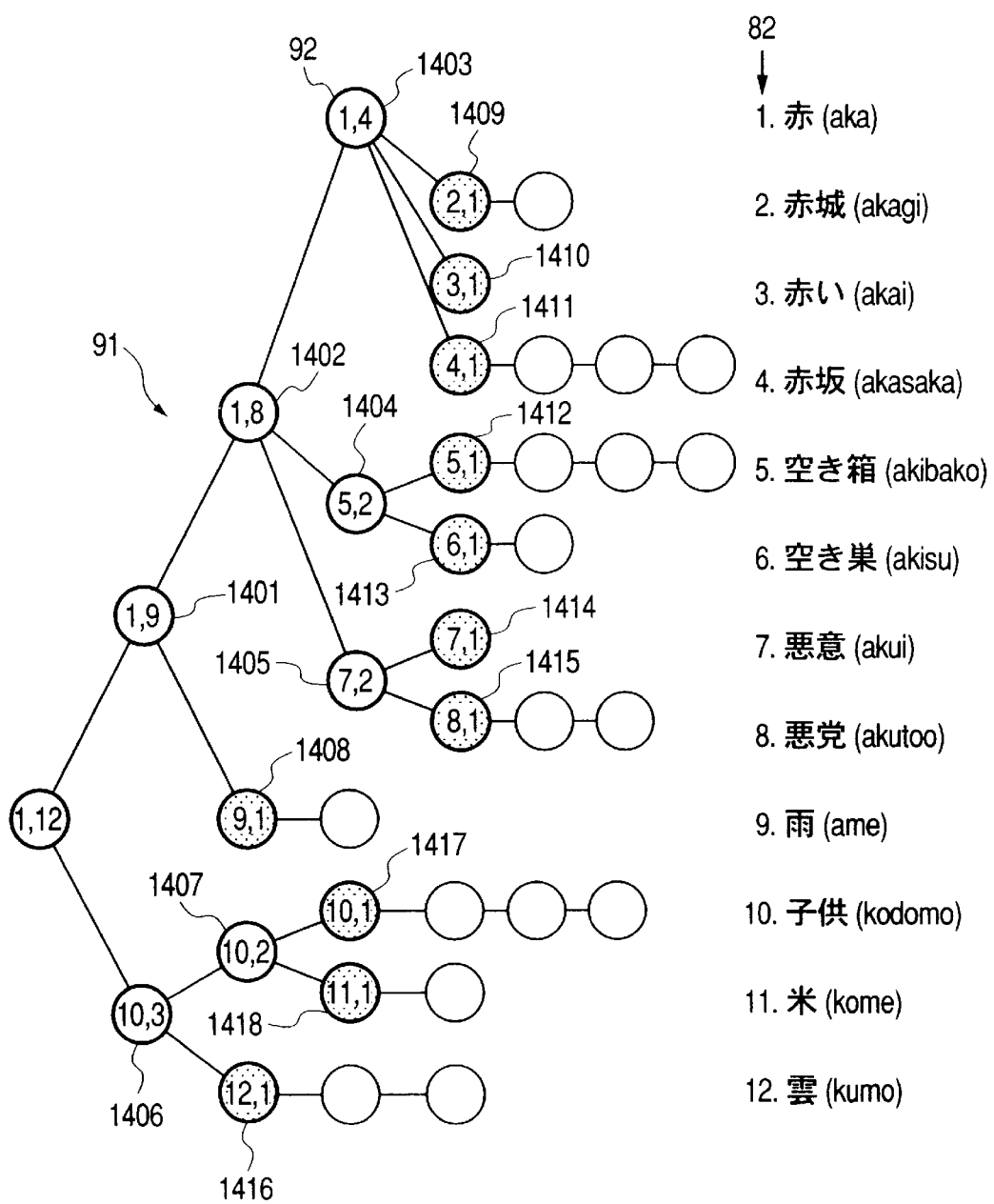
FIG. 14 is a diagram to explain word information in the present embodiment.
Figure 14A:
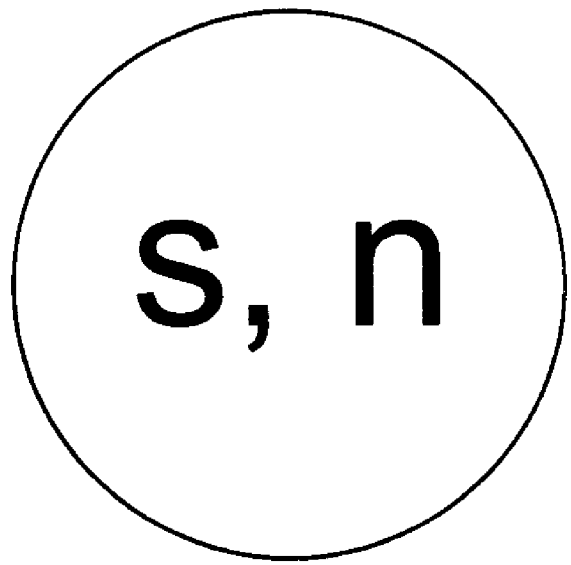
FIG. 14A is a diagram to show an example of a node of the tree-structure word dictionary in the present embodiment.

FIG. 14A is a generic diagram showing the layout of the minimum out of word IDs "s" of words reachable from that node and the number of words "n" reachable from the node in order from the left as specifically illustrated in FIG. 14B and discussed below. Together, numbers "s" and "n" form a number set, (s, n), for each of the illustrated nodes.

Figure 14B:
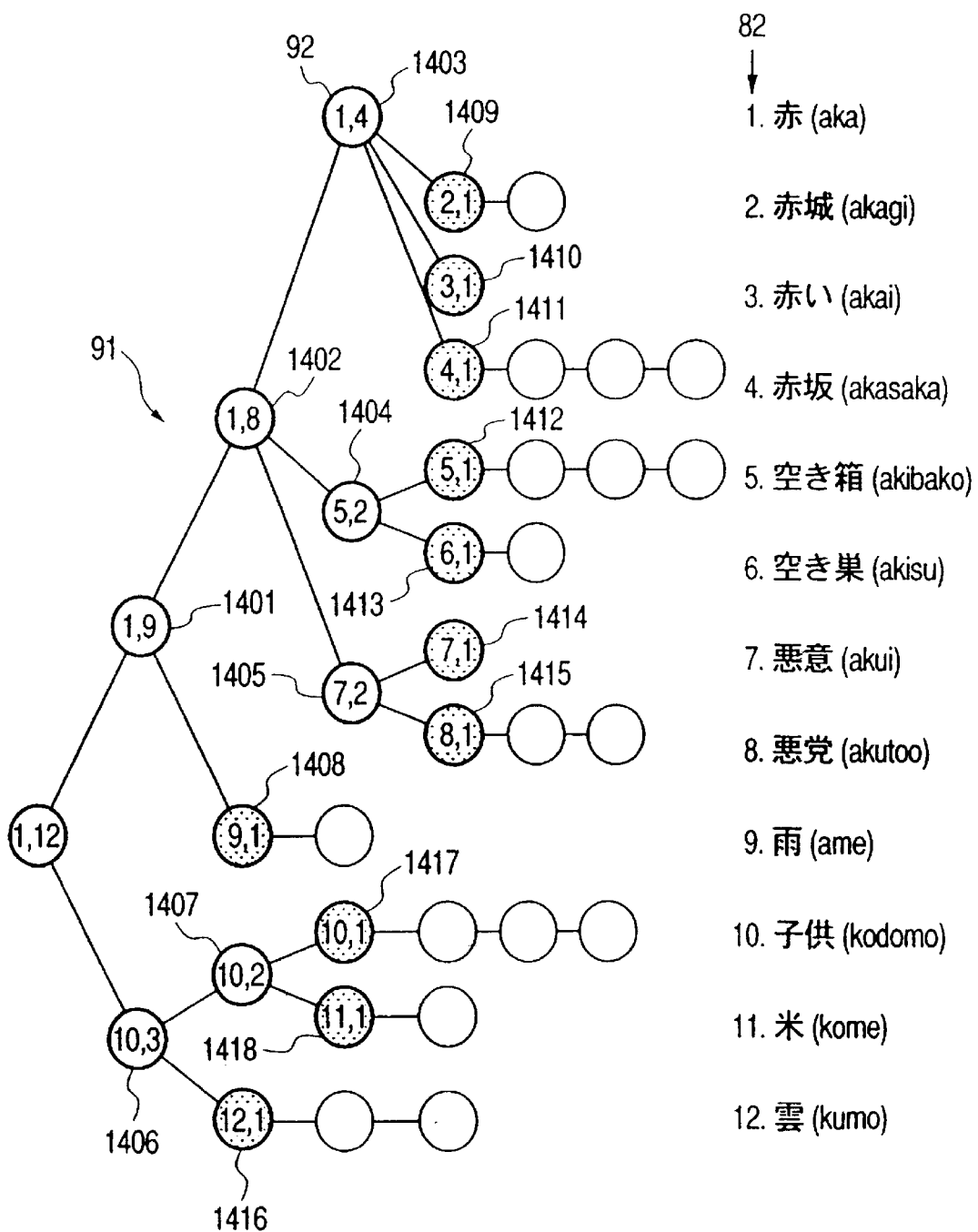
FIG. 14B is a diagram to explain word information in the present embodiment.

FIG. 14B is a diagram to show an example in which word information is given to the tree structure dictionary of FIG. 13. The nodes 1401 to 1418 indicated by bold circles are nodes each having a different set of reachable words from a node immediately before it (i.e., a parent node). Numerals described in each of these nodes indicate a minimum out of words IDs of words reachable from the node ("s" in FIG. 14A) and the number of words reachable from that node ("n" in FIG. 14A) in order from the left. The screened nodes 1408 to 1418 are nodes at each of which a word can be determined uniquely.

FIG. 14 is a diagram to show an example in which the word information is given to the tree structure dictionary of FIG. 13. The nodes 1401 to 1418 indicated by bold circles are nodes each having a different set of reachable words from a node immediately before it (i.e., a parent node). Numerals described in each of these nodes indicate a minimum out of word IDs of words reachable from that node and the number of words reachable from the node in order from the left. The screened nodes 1408 to 1418 are nodes at each of which a word can be determined uniquely.

In this structure of the word dictionary, when matching of phonemes is carried out at a node indicated by a bold circle, a language likelihood can be looked ahead easily from the word information given to the node. As a consequence, the above method can provide the tree-structure word dictionary realizing the reduction of the search space and the reduction of information amount necessary for the tree-structure word dictionary, thereby permitting efficient word search and reference to the language likelihoods.

Although in the above example the minimum out of the word IDs of the reachable words from each of the predetermined nodes was given as one of the word information, a maximum may also be given instead of the minimum.

<Look-ahead process of language likelihood>

Figure 15:
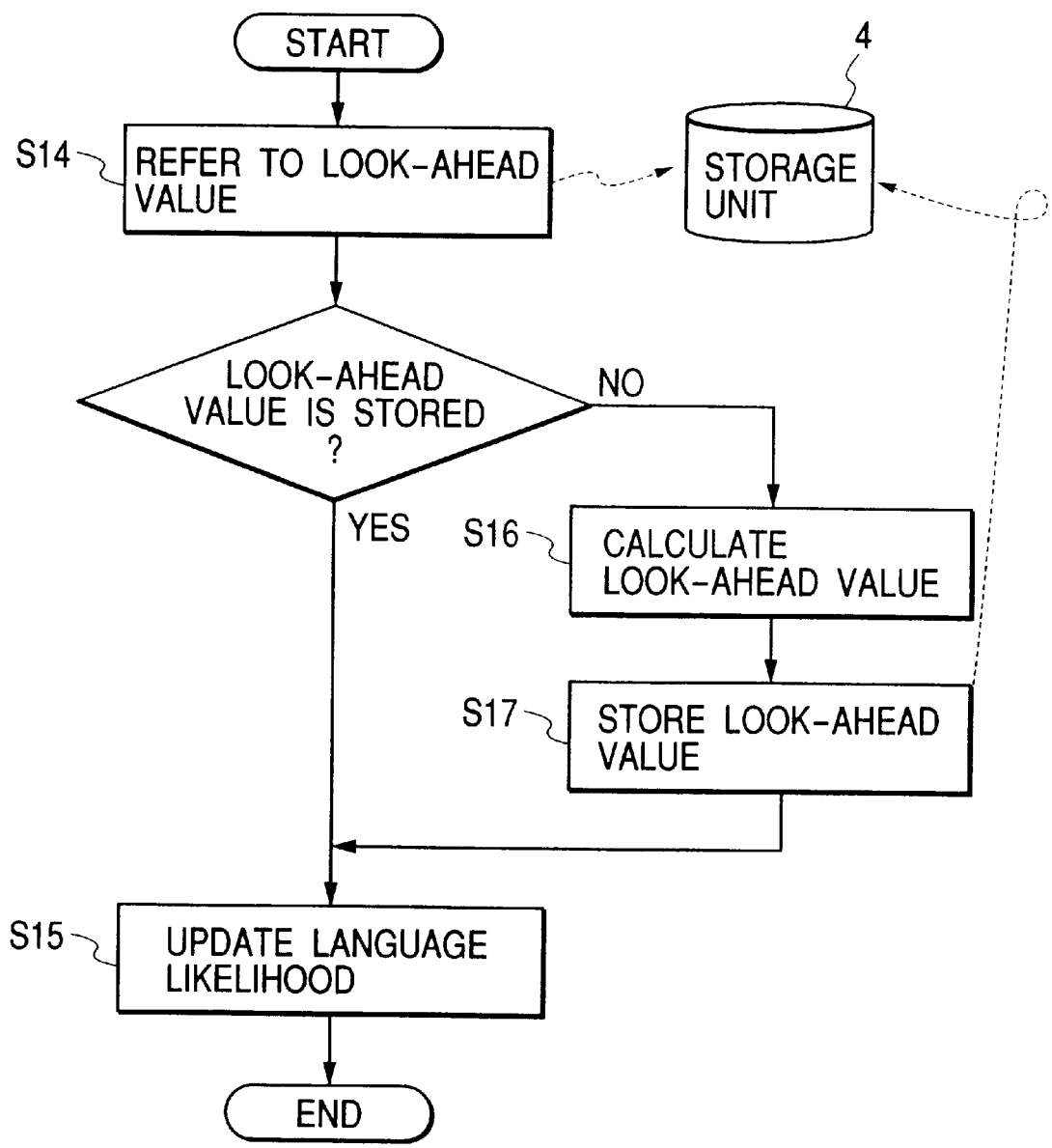
FIG. 15 is a flowchart to explain a look-ahead method of language likelihood in the present embodiment.

FIG. 15 is a flowchart to detail the look-ahead method of language likelihood in the present embodiment.

The look-ahead of language likelihood is carried out according to the procedures illustrated in FIG. 15, on the occasion of updating the cumulative likelihood of the first status of the sound models corresponding to the nodes provided with the word information (the nodes 1401 to 1418 indicated by the bold circles in FIG. 14B). At this time the processor computes the sound likelihood in the case of transition from another state to a current state and updates the language likelihood.

First, step S14 is to make reference to a look-ahead value $\hat{p}_l(s, n)$ specified by the minimum (s) of the word ID and the number of words (n). This look-ahead value $\hat{p}_l(s, n)$ is a maximum out of language likelihoods of n continuous words from the word ID (s).

In cases wherein $\hat{p}_l(s, n)$ is stored on the storage unit 4 such as a memory or a hard disk or the like, the language likelihood of the node is updated to the look-ahead value $\hat{p}_l(s, n)$ stored in the storage unit 4 in step S15 (S15).

On the other hand, in cases wherein $\hat{p}_l(s, n)$ is not stored in the storage unit 4, the look-ahead value $\hat{p}_l(s, n)$ is computed according to the following equation in step S16.

$$\hat{p}_1(s, n) = \max_{i=s \text{ to } s+n-1} (p_1(w_i))$$

In this equation, $p_l(w_i)$ represents the language likelihood of the word corresponding to the word ID(i). This corresponds to the value read in step S3 of FIG. 7.

This computation is to specify the ID information of all the words reachable from the nodes given the word information, using the above-described word information, thereafter obtain the maximum out of the language likelihoods among the word group having the ID information by use of the table as illustrated in FIG. 12, and define the result as a look-ahead value.

Step S17 is to store the obtained look-ahead value $\hat{p}_l(s, n)$ in the storage unit 4 and then step S15 is to update the language likelihood to $\hat{p}_l(s, n)$.

The storage of and reference to the look-ahead value may be carried out using an algorithm effective to random access, such as the hash function or the like. At this time, a location on the storage unit 4 for storage of the look-ahead value is computed using s, n.

In the look-ahead method of language likelihood described above, the bigram may be employed for the language models. In this case, the node information includes three information pieces of a word ID of a preceding word, a minimum of word ID, and the number of words, as the word information.

Similarly, the N-gram may also be employed for the language models. In this case, the node information includes, as the word information, (N+1) information pieces of a word ID of a word upon search (N−1) before, . . . , a word ID of a word upon search one before, a minimum of word ID, and the number of words.

The processing as described above permits the efficient word search to be carried out without largely increasing the storage area for the tree-structure word dictionary, and also permits the recognition accuracy to be improved further.

(Other Embodiments)

It is needless to mention that the objects of the present invention can also be accomplished by supplying a storage medium (or a memory medium) storing the program code of software for realizing the functions of the above-stated embodiment, to a system or apparatus, and allowing a computer (or CPU or MPU) of the system or apparatus to read and carry out the program code stored in the storage medium. In this case, the program code itself read out of the storage medium implements the functions of the above-stated embodiment and the storage medium storing the program code constitutes the present invention. In addition to the form in which the functions of the above-stated embodiment are implemented by making the computer execute the program code read out, it is needless to mention that the invention also involves cases in which an operating system (OS) or the like operating on the computer performs part or all of the actual processing, based on instructions of the program code, and in which the functions of the above-stated embodiment are implemented by that processing.

Further, it is also needless to mention that the invention also involves cases wherein the program code read out of the storage medium is written into a memory provided in a function-extending card inserted into the computer or in a function-extending unit connected to the computer, then a CPU or the like in the function-extending card or in the function-extending unit carries out part or all of the actual processing, and the functions of the above-stated embodiment are implemented by that processing.

In the cases of application of the present invention to the above storage medium, the word dictionary presented as an example in FIG. 13 or FIG. 14 described previously, or the program code corresponding to the flowchart illustrated in FIG. 7, FIG. 10, or FIG. 15 is stored in the storage medium.

The invention may be embodied in other specific forms without departing from the spirit or essential characteristics thereof.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A speech recognition apparatus comprising:
    (a) holding means for holding a tree-structure word dictionary in which sound models at head part of words are shared among words, wherein said tree-structure word dictionary is comprised of nodes representing said sound models; and
    (b) searching means for searching a word corresponding to speech input, using word information given to predetermined nodes forming said tree-structure word dictionary and sound likelihoods obtained based upon said sound models and language likelihoods obtained based on said word information, wherein said word information is information to specify a word group reachable from each of predetermined nodes.

2. The speech recognition apparatus according to claim 1, wherein each of said predetermined nodes is a node having different reachable words from a node immediately before.

3. The speech recognition apparatus according to claim 1, wherein said word information comprises first information to specify a predetermined word included in said word group and second information to indicate the number of words included in said word group.

4. The speech recognition apparatus according to claim 1, wherein said language likelihood is updated on the occasion of obtaining the sound likelihood of said predetermined node.

5. A speech recognition method comprising the steps of:
    (a) holding a tree-structure word dictionary in which sound models at head part of words are shared among words, wherein said tree-structure word dictionary is comprised of nodes representing said sound models; and
    (b) searching for a word corresponding to speech input, using word information given to predetermined nodes forming said tree-structure word dictionary and sound likelihoods obtained based upon said sound models and language likelihoods obtained based on said word information, wherein said word information is information to specify a word group reachable from each of predetermined nodes.

6. The speech recognition method according to claim 5, wherein each of said predetermined node is a node having different reachable words from a node immediately before.

7. The speech recognition method according to claim 5, wherein said word information comprises first information to specify a predetermined word included in said word group and second information to indicate the number of words included in said word group.

8. The speech recognition method according to claim 5, wherein said language likelihood is updated on the occasion of obtaining the sound likelihood of said predetermined node.

9. A computer-readable medium which stored a program, said program comprising the steps of:
    (a) holding a tree-structure word dictionary in which sound models at head part of words are shared among words, wherein said tree-structure word dictionary is comprised of nodes representing said sound models; and
    (b) searching for a word corresponding to speech input, using word information given to predetermined nodes forming said tree-structure word dictionary and sound likelihoods obtained based upon said sound models and language likelihoods obtained based on said word information, wherein said word information is information to specify a word group reachable from each of predetermined nodes.

10. The medium according to claim 9, wherein each of said predetermined nodes is a node having different reachable words from a node immediately before.

11. The medium according to claim 9, wherein said word information comprises first information to specify a predetermined word included in said word group and second information to indicate the number of words included in said word group.

12. The medium according to claim 9, wherein said language likelihood is updated on the occasion of obtaining the sound likelihood of said predetermined node.

13. An apparatus for producing a word dictionary used in speech recognition, said apparatus comprising:
   (a) sorting means for sorting a plurality of words, based on sound models representing the words;
   (b) generating means for generating a tree-structure word dictionary in which sound models at head part of the words are shared among the words, wherein said tree-structure word dictionary is comprised of nodes representing said sound models; and
   (c) providing means for providing predetermined nodes forming said tree-structure word dictionary with word information to specify a word group reachable from each of said predetermined nodes, wherein said word information is used for updating of a language likelihood.

14. The apparatus according to claim 13, wherein each of said predetermined nodes is a node having different reachable words from a node immediately before.

15. The apparatus according to claim 13, wherein said word information comprises first information to specify a predetermined word included in said word group and second information to indicate the number of words included in said word group.

16. A method for producing a word dictionary used in speech recognition, comprising the steps of:
   the (a) sorting a plurality of words, based on sound models representing the words;
   (b) generating a tree-structure word dictionary in which sound models at head part of the words are shared among the words, wherein said tree-structure word dictionary is comprised of nodes representing said sound models; and
   (c) providing predetermined nodes forming said tree-structure word dictionary with word information to specify a word group reachable from each of said predetermined nodes, wherein said word information is used for updating of a language likelihood.

17. The method according to claim 16, wherein each of said predetermined nodes is a node having different reachable words from a node immediately before.

18. The method according to claim 16, wherein said word information comprises first information to specify a predetermined word included in said word group and second information to indicate the number of words included in said word group.

19. A computer-readable medium, said medium storing a program for producing a word dictionary used in speech recognition, said program comprising the steps of:
   (a) sorting a plurality of words, based on sound models representing the words;
   (b) generating a tree-structure word dictionary in which sound models at head part of the words are shared among the words, wherein said tree-structure word dictionary is comprised of nodes representing said sound models; and
   (c) providing predetermined nodes forming said tree-structure word dictionary with word information to specify a word group reachable from each of said predetermined nodes, wherein said word information is used for updating of a language likelihood.

20. The medium according to claim 19, wherein each of said predetermined nodes is a node having different reachable words from a node immediately before.

21. The medium according to claim 19, wherein said word information comprises first information to specify a predetermined word included in said word group and second information to indicate the number of words included in said word group.

* * * * *